US012179584B2

(12) United States Patent
Horie et al.

(10) Patent No.: US 12,179,584 B2
(45) Date of Patent: Dec. 31, 2024

(54) MECHANISM FOR PREVENTING POWER GENERATION DURING TOWING OF ELECTRIC VEHICLE AND ELECTRIC VEHICLE TOWING METHOD USING THE MECHANISM

(71) Applicant: SUBARU CORPORATION, Tokyo (JP)

(72) Inventors: Shinya Horie, Tokyo (JP); Daisuke Kidachi, Tokyo (JP); Koki Ando, Tokyo (JP); Kaoru Sugano, Tokyo (JP); Gentaro Nakaoka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/614,035

(22) Filed: Mar. 22, 2024

(65) Prior Publication Data

US 2024/0326585 A1    Oct. 3, 2024

(30) Foreign Application Priority Data

Mar. 31, 2023   (JP) .................................. 2023-057484

(51) Int. Cl.
*B60K 23/02*      (2006.01)
*B60K 17/02*      (2006.01)
(Continued)

(52) U.S. Cl.
CPC .............. *B60K 23/02* (2013.01); *B60K 17/02* (2013.01); *F16D 11/08* (2013.01); *B60K 1/02* (2013.01); *B60K 17/14* (2013.01); *B60Y 2300/28* (2013.01)

(58) Field of Classification Search
CPC ........ B60K 23/02; B60K 17/02; B60K 17/14; B60K 1/02; F16D 11/08; F16D 2011/004;
(Continued)

(56) References Cited

U.S. PATENT DOCUMENTS 5,623,851 A    4/1997  Ooyama et al.
6,619,456 B1 *  9/2003 Juhl ........................ F16D 11/14
                                                         192/69.43

(Continued)

FOREIGN PATENT DOCUMENTS

JP          3522827 B2    4/2004
JP       2008-182842 A    8/2008

*Primary Examiner* — Jacob S. Scott
*Assistant Examiner* — Farhana Pervin
(74) *Attorney, Agent, or Firm* — Rimon P.C.

(57) ABSTRACT

A mechanism for preventing power generation during towing of an electric vehicle. The mechanism includes: a rod-shaped coupling member receiver into which a rod-shaped coupling member to be used during the towing is configured to be inserted on a front portion or a rear portion of the electric vehicle, and to which the inserted rod-shaped coupling member is configured to be locked; and a switcher that is provided between the axle and the decelerator, and that is configured to bring the axle and the decelerator into a decoupled state in an inserting operation of inserting the rod-shaped coupling member into the rod-shaped coupling member receiver, and to bring the axle and the decelerator into a coupled state in a removing operation of removing the rod-shaped coupling member from the rod-shaped coupling member receiver.

5 Claims, 4 Drawing Sheets

(51) Int. Cl.
*F16D 11/08* (2006.01)
*B60K 1/02* (2006.01)
*B60K 17/14* (2006.01)

(58) Field of Classification Search
CPC  F16D 2023/123; F16D 11/14; B60Y 2300/28
See application file for complete search history.

(56) References Cited

U.S. PATENT DOCUMENTS

| | | | |
|---|---|---|---|
| 9,004,519 B1* | 4/2015 | Beech | B62D 13/06 |
| | | | 280/442 |
| 2019/0009760 A1* | 1/2019 | Zenner | B60T 8/323 |
| 2021/0114422 A1* | 4/2021 | Goodarzi | B60D 1/24 |
| 2023/0086462 A1* | 3/2023 | Furuya | B60D 1/486 |
| | | | 280/503 |
| 2024/0025294 A1* | 1/2024 | Treharne | B60L 3/003 |

* cited by examiner

REAR SIDE

FRONT SIDE

MECHANISM FOR PREVENTING POWER GENERATION DURING TOWING OF ELECTRIC VEHICLE AND ELECTRIC VEHICLE TOWING METHOD USING THE MECHANISM

CROSS-REFERENCE TO RELATED APPLICATIONS

The present application claims priority from Japanese Patent Application No. 2023-057484 filed on Mar. 31, 2023, the entire contents of which are hereby incorporated by reference.

BACKGROUND

The disclosure relates to a mechanism for preventing power generation during towing of an electric vehicle, and an electric vehicle towing method using the mechanism, for example, to a mechanism for preventing power generation during towing of an electric vehicle which prevents power generation in the vehicle to be towed when the electric vehicle is being towed by a towing vehicle, and an electric vehicle towing method using the mechanism.

Since an electric motor in an electric vehicle is coupled to wheels, when the wheels rotate while the electric motor is stopped, the electric motor also rotates, and a power generation action occurs by the rotation of the electric motor. When such an unintended power generation action occurs, that is, when the electric motor rotates due to the rotation of the wheels and a back electromotive force is generated, such a back electromotive force is directly applied to the electric motor and high voltage components, which may cause damage to the electric motor and the high voltage components. Therefore, when towing the electric vehicle by a towing vehicle, it is necessary to consider that the wheels of the electric vehicle being towed do not rotate.

Therefore, during the towing, it is necessary to lift drive wheels to tow the electric vehicle. That is, as illustrated in FIGS. 5A and 5B, an electric vehicle 52 is carried by being placed on a loading platform of a towing vehicle 50 (see FIG. 5A), or is towed by placing drive wheels on a carriage 54 (see FIG. 5B). In this way, the power generation of the electric motor is prevented.

Japanese Patent No. 3522827 discloses a similar technique of preventing generation of a back electromotive force in a vehicle being towed. In this vehicle, a transmission is provided with a one-way clutch that engages with a power transmission circuit between an electric motor and drive wheels to establish a starting shift stage and a shift clutch that engages with the power transmission circuit to establish a shift stage other than the starting shift stage. Further, a configuration is disclosed in which the transmission is further provided with a clutch, and a coupling relationship between a rotation shaft of the electric motor and an axle can be released by the clutch.

In Japanese Unexamined Patent Application Publication (JP-A) No. 2008-182842, an inverter device and an AC motor generator are electrically disconnected by a switch, and even when a rotor of the AC motor generator rotates by towed traveling and a back electromotive force is generated, a short circuit current does not flow to the AC motor generator and the inverter device.

SUMMARY

An aspect of the present disclosure provides a mechanism for preventing power generation during towing of an electric vehicle. The electric vehicle includes an electric motor as a traveling power source, a power transmission shaft configured to transmit a rotation force of the electric motor to an axle via a decelerator, and one or more wheels configured to rotate together with the axle. The mechanism includes: a rod-shaped coupling member receiver into which a rod-shaped coupling member to be used during the towing is configured to be inserted on a front portion or a rear portion of the electric vehicle, and to which the inserted rod-shaped coupling member is configured to be locked; and a switcher that is provided between the axle and the decelerator, and that is configured to bring the axle and the decelerator into a decoupled state in an inserting operation of inserting the rod-shaped coupling member into the rod-shaped coupling member receiver, and to bring the axle and the decelerator into a coupled state in a removing operation of removing the rod-shaped coupling member from the rod-shaped coupling member receiver.

An aspect of the present disclosure provides an electric vehicle towing method using the mechanism. The towing of the electric vehicle includes: bringing the axle and the decelerator into the decoupled state by inserting the rod-shaped coupling member into the rod-shaped coupling member receiver of the electric vehicle during the towing; and bringing the axle and the decelerator into the coupled state by performing the removing operation of removing the rod-shaped coupling member at an end of the towing.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In Japanese Patent No. 3522827, rotation transmission between the wheels and the electric motor is shut off by the clutch. The rotation transmission is reliably prevented by this configuration, but in order to provide the clutch in the transmission, a structure of the transmission becomes complicated and large-scale. In JP-A No. 2008-182842, the inverter device and the AC motor generator are electrically disconnected by the switch, but even when the inverter device and the AC motor generator are electrically disconnected by the switch, the AC motor generator still performs power generation. Therefore, there is a possibility of adversely affecting cables, high voltage components, and the like.

It is desirable to provide a mechanism for preventing power generation during towing of an electric vehicle, which does not transmit rotation of axles of the electric vehicle to an electric motor when the electric vehicle is being towed and which has a simple configuration, and an electric vehicle towing method using the mechanism.

Hereinafter, a mechanism for preventing power generation during towing of an electric vehicle and an electric vehicle towing method using the mechanism according to an embodiment of the disclosure will be described in detail with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

As an electric vehicle to which the mechanism for preventing power generation according to the embodiment of the disclosure is applied, an electric vehicle including an electric motor as s a traveling power source, a power transmission shaft that transmits a rotation power of the electric motor to an axle via a decelerator, and a wheel that rotates together with the axle individually for front wheels and rear wheels at the front and rear of the vehicle is used.

Figure 1:
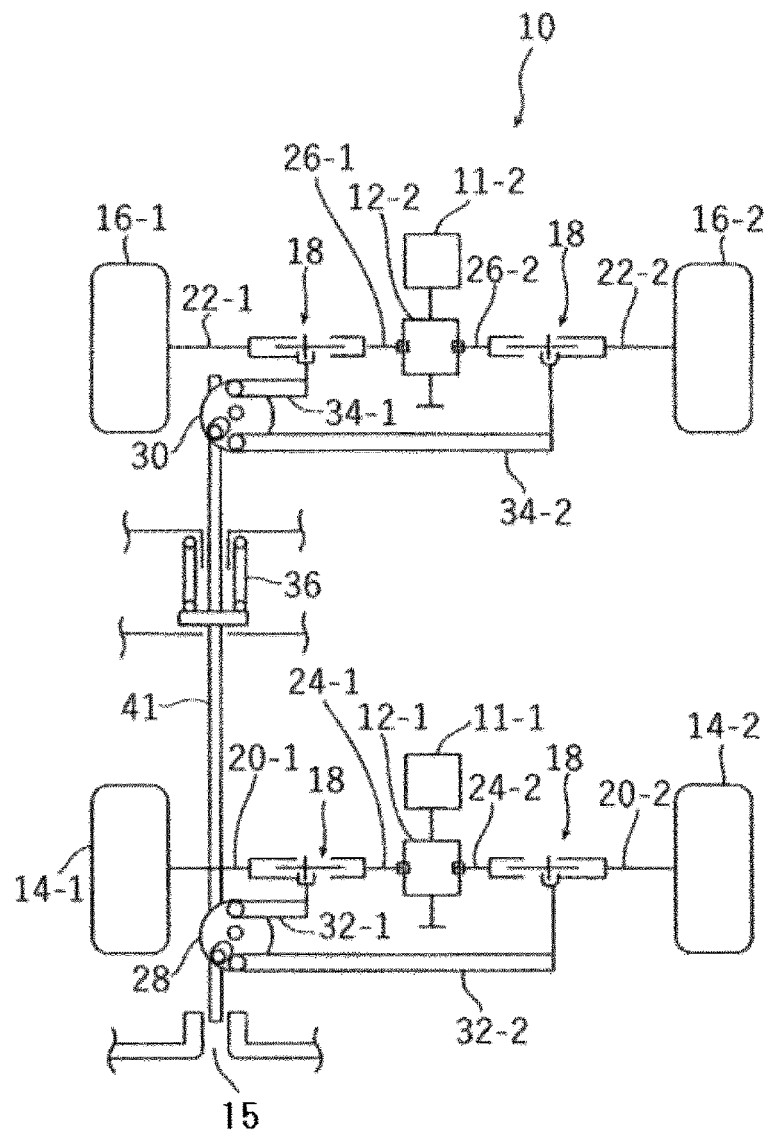
FIG. 1 is a schematic configuration diagram of a mechanism for preventing power generation during towing of an electric vehicle according to an embodiment of the disclosure in normal traveling.

FIG. 1 illustrates a mechanism 10 for preventing power generation during towing of an electric vehicle according to the embodiment of the disclosure, and mainly illustrates a power transmission system of the electric vehicle. Front wheels 14-1 and 14-2 and rear wheels 16-1 and 16-2 of the electric vehicle are driven by electric motors 11-1 and 11-2, respectively. That is, the front wheels 14-1 and 14-2 and the rear wheels 16-1 and 16-2 are connected to power transmission shafts 24-1 and 24-2 and 26-1 and 26-2 that respectively extend from decelerators 12-1 and 12-2 such that power of the electric motors 11-1 and 11-2 is transmitted to the front wheels 14-1 and 14-2 and the rear wheels 16-1 and 16-2 via the decelerators 12-1 and 12-2, respectively.

Further, an eyebolt receiver 15 into which an eyebolt 13, which is a rod-shaped coupling member necessary for towing the vehicle, is inserted is provided at a front portion of the vehicle. The eyebolt 13 is inserted into the eyebolt receiver 15 while being screwed and locked therein.

In the mechanism 10 for preventing power generation according to the disclosure, a switcher 18 is provided between the decelerator 12-1 on a front wheels 14-1 and 14-2 side and respective one of axles 20-1 and 20-2, and between the decelerator 12-2 on a rear wheels 16-1 and 16-2 side and respective one of axles 22-1 and 22-2, to switch the axles 20-1, 20-2, 22-1, and 22-2 and the decelerators 12-1 and 12-2 to a decoupled state during an inserting operation of inserting the eyebolt 13 into the eyebolt receiver 15 and to a coupled state during a removing operation of removing the eyebolt 13 from the eyebolt receiver 15.

That is, the axles 20-1 and 20-2 of the front wheels 14-1 and 14-2 are respectively connected with the switchers 18 and 18, and the switchers 18 and 18 are connected with the power transmission shafts 24-1 and 24-2 that extend from the decelerator 12-1. Similarly, the axles 22-1 and 22-2 of the rear wheels 16-1 and 16-2 are respectively connected with the switchers 18 and 18, and the switchers 18 and 18 are connected with the power transmission shafts 26-1 and 26-2 that extend from the decelerator 12-2.

Details of the switcher 18 will be described with reference to FIG. 3, and the switcher 18 serves to transmit or shut off rotation of the power transmission shafts 24-1, 24-2, 26-1, and 26-2 to the axles 20-1, 20-2, 22-1, and 22-2. In other words, the switcher 18 brings the axles 20-1, 20-2, 22-1, and 22-2 and the power transmission shafts 24-1, 24-2, 26-1, and 26-2 of the electric vehicle into the coupled state or the decoupled state.

Regarding the switching of the switcher 18 based on the inserting operation of inserting the eyebolt 13 into the eyebolt receiver 15 and the removing operation of removing the eyebolt 13 from the eyebolt receiver 15, a linkage mechanism is provided so as to enable a total of four switchers 18 to perform the switching simultaneously. That is, couplings or decouplings of the axles 20-1, 20-2, 22-1, and 22-2 and the power transmission shafts 24-1, 24-2, 26-1, and 26-2 are all linked to each other.

When the drive wheels are simply the front wheels 14-1 and 14-2 or the rear wheels 16-1 and 16-2, such a linkage mechanism is not provided, and in this case, the axle 20, 22 and the decelerator 12 are directly brought into the decoupled state by the inserting operation of inserting the eyebolt 13 into the eyebolt receiver 15.

The front wheels 14-1 and 14-2 in the above-mentioned linkage operation will be described. Firstly, a disc member 28 including a rotation shaft is attached, a right coupling rod 32-1 and a left coupling rod 32-2 are attached to the disc member 28. Similarly, regarding the rear wheels 16-1 and 16-2, a disc member 30 having a rotation shaft is attached, and a right coupling rod 34-1 and a left coupling rod 34-2 are attached to the disc member 30.

When the disc member 28 of the front wheels 14-1 and 14-2 rotates rearward of the vehicle, the right coupling rod 32-1 slides to a left side of the vehicle, and the left coupling rod 32-2 slides to a right side of the vehicle. Similarly, when the disc member 30 of the rear wheels 16-1 and 16-2 rotates rearward of the vehicle, the right coupling rod 34-1 slides to the left side of the vehicle, and the left coupling rod 34-2 slides to the right side of the vehicle. The disc member 28 of the front wheels 14-1 and 14-2 and the disc member 30 of the rear wheels 16-1 and 16-2 are coupled to each other by a rod-shaped member 41 such that the disc member 28 of the front wheels 14-1 and 14-2 and the disc member 30 of the rear wheels 16-1 and 16-2 rotate simultaneously. When the rod-shaped member 41 slides rearward of the vehicle, the disc member 28 of the front wheels 14-1 and 14-2 and the disc member 30 of the rear wheels 16-1 and 16-2 rotate simultaneously. The rod-shaped member 41 is urged toward a front side of the vehicle by an urging member 36, and returns to an original state when the rearward slide is released, and the disc members 28 and 30 return to an original state.

The right coupling rod 32-1 and the left coupling rod 32-2 of the front wheels 14-1 and 14-2, and the right coupling rod 34-1 and the left coupling rod 34-2 of the rear wheels 16-1 and 16-2 will be described in detail in FIG. 3, each of which is locked to a pawl 46 provided on a movable shaft 42 constituting the switcher 18 such that the movable shaft 42 can slide to the left side or the right side of the vehicle.

When the drive wheels are simply the rear wheels 16-1 and 16-2, the coupling rods 34 slide to the left or right by the inserting operation of inserting the eyebolt 13 into the eyebolt receiver 15, whereby the movable shaft 42 slides to the left or right. Accordingly, the axles 22 and the decelerator 12 are brought into the decoupled state.

Figure 2:
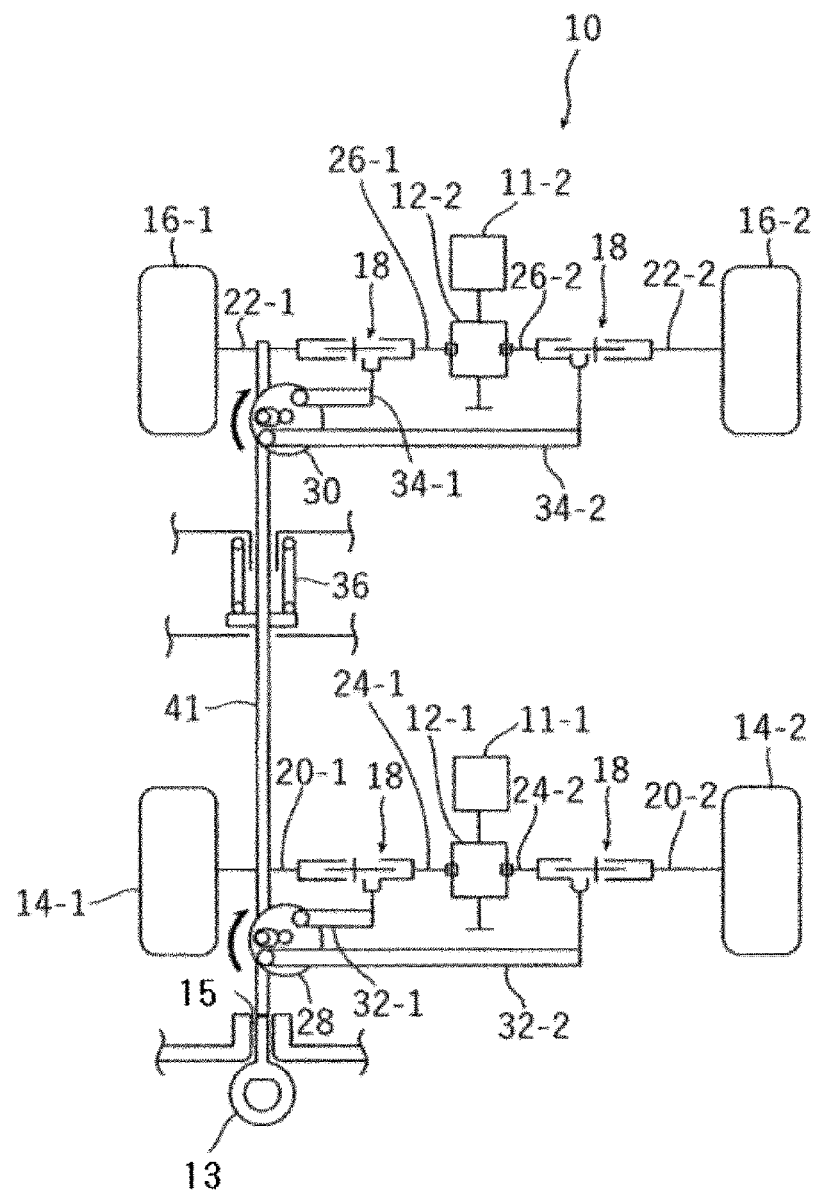
FIG. 2 is a schematic configuration diagram of the mechanism for preventing power generation during towing of the electric vehicle according to an embodiment of the disclosure, when the vehicle is being towed.

FIG. 2 is a schematic configuration diagram of the mechanism 10 for preventing power generation during towing and illustrates activation of the above-mentioned linkage mechanism. In the electric vehicle, the rod-shaped member 41 of the linkage mechanism slides rearward of the vehicle by inserting the eyebolt 13 into the eyebolt receiver 15 for towing. That is, a configuration is obtained in which the rod-shaped member 41 of the linkage mechanism slides rearward of the vehicle by the inserting operation of the eyebolt 13.

When the rod-shaped member 41 slides rearward, the disc member 28 of the front wheels 14-1 and 14-2 and the disc member 30 of the rear wheels 16-1 and 16-2 rotate rearward, the right coupling rods 32-1 and 34-1 of the front wheels 14-1 and 14-2 and the rear wheels 16-1 and 16-2 slide to the left side of the vehicle, and the left coupling rods 32-2 and 34-2 of the front wheels 14-1 and 14-2 and the rear wheels 16-1 and 16-2 slide to the right side of the vehicle. With this slide, at the switcher 18 on a left side in a vehicle forward direction, the movable shaft 42 slides to the right side of the vehicle. At the switcher 18 on a right side in the vehicle forward direction, the movable shaft 42 slides to the left side of the vehicle.

Figure 3:
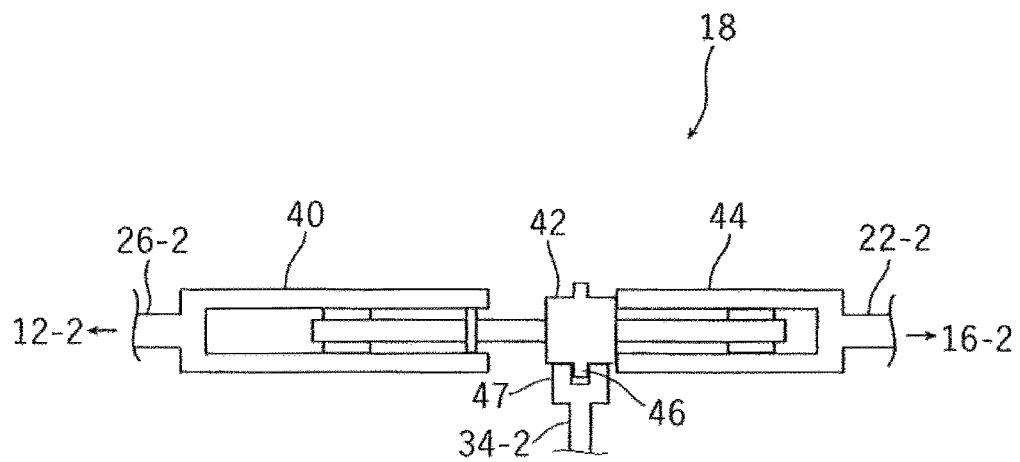
FIG. 3 is a detailed diagram illustrating a switcher in FIG. 1.

FIG. 3 is a detailed diagram illustrating the switcher 18 illustrated in FIG. 1. As described above, four switchers 18 are provided, and all of the switchers 18 have the same structure. Herein, the switcher 18 provided on a left rear wheel 16-2 side of the vehicle will be described.

The switcher 18 includes a first fixed shaft 40, the movable shaft 42, and a second fixed shaft 44 attached inside a housing (not illustrated). The second fixed shaft 44 is directly coupled to the axle 22-2. The first fixed shaft 40 is directly coupled to the power transmission shaft 26-2 that extends from the decelerator 12-2. The movable shaft 42 is slidable in a left-right direction of the vehicle between the first fixed shaft 40 and the second fixed shaft 44, and the slide is performed by the left coupling rod 34-2.

The movable shaft 42 has a spline shaft structure so as to fit into the first fixed shaft 40 and the second fixed shaft 44, and the first fixed shaft 40 and the second fixed shaft 44 each have a boss structure to fit into the spline shaft of the movable shaft 42. Therefore, a coupling or a decoupling between the axle 22-2 and the decelerator 12-2 is performed by separating or fitting of mechanical structures including the spline shaft and the boss. Accordingly, it is possible to easily perform the coupling or the decoupling between the axle 22-2 and the decelerator 12-2, and further between the axle 22-2 and the power transmission shaft 26-2 with a simple mechanical structure.

In order to allow the movable shaft 42 to slide in the left-right direction of the vehicle, the movable shaft 42 is provided with the pawl 46, and the left coupling rod 34-2 is provided with a locking member 47 that locks to the pawl 46.

Figure 4:
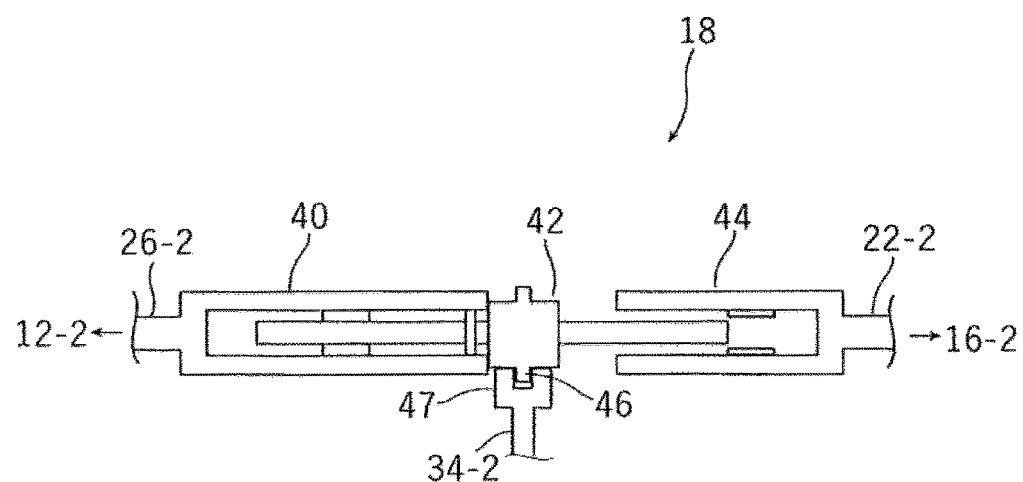
FIG. 4 is a detailed diagram illustrating the switcher in FIG. 2.
Figure 5A:
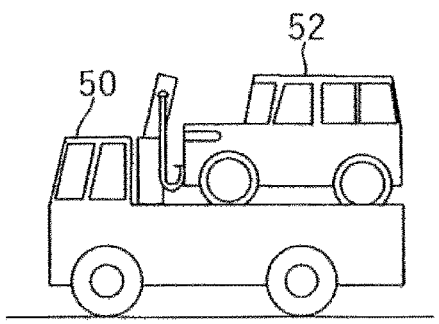
FIGS. 5A and 5B are diagrams illustrating an electric vehicle towing method.
Figure 5B:
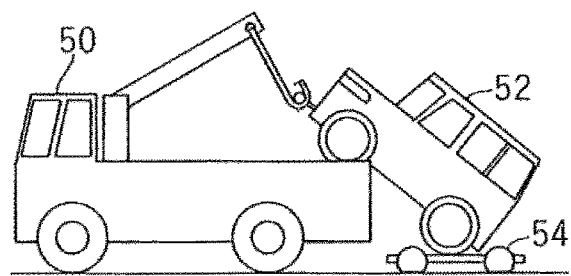

FIG. 4 is a detailed diagram illustrating the switcher 18 illustrated in FIG. 2. Similarly, the switcher 18 provided on the left rear wheel 16-2 side of the vehicle will be described here.

The movable shaft 42 of the switcher 18 slides to the right side of the vehicle when the left coupling rod 34-2 slides to the right side of the vehicle during the towing. Accordingly, the first fixed shaft 40 and the movable shaft 42 are in a fitted state, and the movable shaft 42 and the second fixed shaft 44 are in a separated state. As a result, even when the wheel 16-2 rotates, this rotation is not transmitted to the power transmission shaft and therefore, the electric motor does not rotate either, and power generation is prevented.

The same applies to the other three switchers 18. That is, during the towing, the axles 24-1, 24-2, 26-1, and 26-2 of the wheels 14-1, 14-2, 16-1, and 16-2 and the power transmission shafts 24-1, 24-2, 26-1, and 26-2 are brought into the decoupled state by the switchers 18, and no rotation is transmitted to the electric motors 11-1 and 11-2 even when the wheels rotate. Therefore, even when the vehicle is being towed while all the wheels are on the ground and are rotated by a normal towing method, power generation does not occur in the electric motor. As a result, high voltage generation does not occur, and therefore, protection for the high voltage components and the electric motors is achieved.

When the eyebolt 13 is inserted into the eyebolt receiver 15 in order to tow the electric vehicle, the linkage mechanism is operated, and the switchers 18 and 18 of both of the front wheels 14-1 and 14-2 and the rear wheels 16-1 and 16-2 are operated. Accordingly, it is possible to tow the vehicle with all four wheels on the ground. That is, in a four-wheel drive vehicle, on the front wheels 14-1 and 14-2 side and the rear wheels 16-1 and 16-2 side, between the respective axles 20 and 22 and the decelerator 12, the axle 20, 22 and the decelerator 12 are switched to the decoupled state by the switcher 18, and therefore, even when the four wheels rotate, the rotation is not transmitted to the electric motors.

Further, when the electric vehicle is being towed, an inserting and locking operation of the eyebolt 13 to the eyebolt receiver 15 for coupling a towing vehicle to the towed vehicle is performed, and by this operation, the axles 20-1, 20-2, 22-1, and 22-2 and the decelerators 12-1, 12-2 are mechanically brought into the decoupled state. Therefore, even when the wheels 14-1, 14-2, 16-1, and 16-2 of the towed electric vehicle rotate during the towing, the rotation force is not transmitted to the decelerators 12-1 and 12-2 and further the power transmission shafts 24-1, 24-2, 26-1, and 26-2. Therefore, by an operation constantly performed during the towing, that is the inserting and locking operation of the eyebolt 13 to the eyebolt receiver 15, separation of the axles 20-1 and 20-2 from the decelerator 12-1 and separation of the axles 22-1 and 22-2 from the decelerator 12-2 are performed simultaneously, which is features of the disclosure, and therefore, the switching operation is simply, reliably, and quickly performed.

In addition, an electric vehicle towing method according to the disclosure is an electric vehicle towing method using the mechanism for preventing power generation during towing of an electric vehicle. Towing of the electric vehicle includes: bringing the axle 20, 22 and the decelerator 12 into a decoupled state by inserting a rod-shaped coupling member 13 into a rod-shaped coupling member receiver 15 of the electric vehicle during towing; and bringing the axle 20, 22 and the decelerator 12 into a coupled state by performing a removing operation of removing the rod-shaped coupling member 13 at an end of the towing.

Accordingly, rotation of the wheels 14 and 16 that are on the ground and that rotate is not transmitted to the electric motor 11, and power generation by the electric motor 11 is prevented. Therefore, the electric vehicle can be towed safely and securely, and various mounted components on the electric vehicle can be prevented from being damaged.

According to this method, when an electric vehicle is being towed, in the electric vehicle, the axles 20-1, 20-2, 22-1, and 22-2 and the power transmission shafts 24-1, 24-2, 26-1, and 26-2 are brought into a decoupled state by the switchers 18, and therefore, even when the wheels coupled to the electric motors are on the ground and towed and the wheels rotate, the rotation of the wheels is not transmitted to the electric motors 11-1 and 11-2, and the power generation action in the electric motors does not occur. That is, even when the wheels rotate, the transmission of the rotation force by the rotation is shut off at the switchers. Therefore, the electric vehicle can be normally towed without being placed on the towing vehicle and without performing a work of placing the wheels coupled to the electric motors of the electric vehicle on a carriage. Accordingly, the electric vehicle can be towed normally, cost of a towing work is reduced, and the towing work is simplified.

The disclosure is not limited to the embodiments described above, and various modifications and alterations may be made without departing from the gist of the disclosure. For example, the linkage mechanism includes the disc members 28 and 30, the rod-shaped member 41, the right coupling rods 32-1 and 34-1, and the left coupling rods 32-2 and 34-2. However, the disc members 28 and 30 are not limited to being circular, and may also be triangular. In addition, in order to slide the movable shaft 42 of the switcher 18, the movable shaft 42 is provided with the pawl 46 and the coupling rods 32 and 34 are provided with the locking members 47, but the configuration is not limited to this.

According to the mechanism for preventing power generation during towing of an electric vehicle and the electric vehicle towing method using the mechanism of the disclosure, with the simple structure, when the electric vehicle is being towed, the rotation of the wheels that are on the ground and that rotate is not transmitted to the electric motors, and the power generation by the electric motors is prevented. Therefore, the electric vehicle can be towed safely and securely, and various mounted components on the electric vehicle can be prevented from being damaged.

The invention claimed is:

1. A mechanism for preventing power generation during towing of an electric vehicle, the electric vehicle comprising an electric motor as a traveling power source, a power transmission shaft configured to transmit a rotation force of the electric motor to an axle via a decelerator, and one or more wheels configured to rotate together with the axle, the mechanism comprising:
   a rod-shaped coupling member receiver into which a rod-shaped coupling member to be used during the towing is configured to be inserted on a front portion or a rear portion of the electric vehicle, and to which the inserted rod-shaped coupling member is configured to be locked; and
   a switcher that is provided between the axle and the decelerator, and that is configured to bring the axle and the decelerator into a decoupled state in an inserting operation of inserting the rod-shaped coupling member into the rod-shaped coupling member receiver, and to bring the axle and the decelerator into a coupled state in a removing operation of removing the rod-shaped coupling member from the rod-shaped coupling member receiver.

2. The mechanism for preventing the power generation during towing of the electric vehicle according to claim 1, wherein
   the switcher comprises a spline shaft configured to rotate together with the power transmission shaft, and a boss configured to rotate together with the axle and into which the spline shaft is fittable, and
   a switching operation of the switcher is performed by disengaging the spline shaft from the boss along with the inserting operation of inserting the rod-shaped coupling member and fitting the spline shaft into the boss by the removing operation of removing the rod-shaped coupling member.

3. The mechanism for preventing the power generation during towing of the electric vehicle according to claim 1, wherein
   the one or more wheels comprise front wheels and rear wheels,
   the electric vehicle comprises a front mechanism for the front wheels and a rear mechanism for the rear wheels,
   each of the front mechanism and the rear mechanism comprises the electric motor, the power transmission shaft, the decelerator, the axle, and the switcher, and
   a linkage mechanism is provided for each switcher, the linkage mechanism being configured to simultaneously switch both of the switcher of the front mechanism and the switcher of the rear mechanism in the inserting operation and the removing operation.

4. The mechanism for preventing the power generation during towing of the electric vehicle according to claim 2, wherein
   the one or more wheels comprise front wheels and rear wheels,
   the electric vehicle comprises a front mechanism for the front wheels and a rear mechanism for the rear wheels,
   each of the front mechanism and the rear mechanism comprises the electric motor, the power transmission shaft, the decelerator, the axle, and the switcher, and
   a linkage mechanism is provided for each switcher, the linkage mechanism being configured to simultaneously switch both of the switcher of the front mechanism and the switcher of the rear mechanism in the inserting operation and the removing operation.

5. An electric vehicle towing method using the mechanism according to claim 1, the towing of the electric vehicle comprising:
   bringing the axle and the decelerator into the decoupled state by inserting the rod-shaped coupling member into the rod-shaped coupling member receiver of the electric vehicle during the towing; and
   bringing the axle and the decelerator into the coupled state by performing the removing operation of removing the rod-shaped coupling member at an end of the towing.

* * * * *